United States Patent Office 2,968,639
Patented Jan. 17, 1961

2,968,639
PROCESS OF INCORPORATING CHLORINATED DIPHENYL INTO CRYSTALLINE POLYESTERS AND PRODUCTS THEREFROM

John R. Caldwell and Russell Gilkey, Kingsport, Tenn., assignors to Eastman Kodak Company, Rochester, N.Y., a corporation of New Jersey No Drawing. Filed July 30, 1956, Ser. No. 600,678

7 Claims. (Cl. 260—33.8)

This invention relates to the incorporation of certain additives into polyester compositions. More particularly this invention is concerned with incorporating certain chlorinated aromatic compounds into high molecular weight linear polyesters whereby polyesters are rendered more susceptible to molding, with the resulting production of a relatively non-brittle molded product.

In recent years there have become available a number of high melting linear crystalline polyesters. While these polyesters materials have valuable properties and uses, up to the present time they have not been useful for molding purposes because of their brittleness. In other words, when such polyesters have been molded into pieces, exemplified by rods and the like, such rods could not be bent to any extent without breakage.

It is apparent therefore that the development of procedure whereby such polymeric materials as aforesaid may be rendered suitable for fabrication represents a highly desirable result. After extended investigation we have found that there are certain compounds which may be incorporated with the polyesters and which materially improve such polyesters for molding purposes.

This invention has for one object to provide additives for high molecular weight, high melting linear polyesters, which additives materially improve such compositions for molding purposes. A particular object of this invention is to provide polyester compositions that are suitable for molding and extrusion. Another object of the invention is to provide polyester compositions which contain a content of a plasticizing ingredient in the composition. Another object of this invention is to incorporate chlorinated polynuclear aromatic hydrocarbons into high molecular weight linear polyesters. Still a further object is to provide plasticized polyester compositions which are suitable for the production of tough, flexible products exemplified by sheets, rods, tubes, films and the like. Still another object is to provide a polyester composition which is plasticized and which is adaptable to molding at relatively elevated temperatures. Other objects will appear hereinafter.

As already indicated it is known that the high melting crystalline polyesters usually can not be molded by conventional methods because they tend to give brittle moldings with poor physical properties. Apparently such molding operations may cause the formation of large crystals during the cooling stage of the molding operation. Such crystals may give rise to a coarse grain structure which causes brittleness.

We have found that there are certain chemical compounds, as will be described in detail herein, which may be incorporated with polyester compositions prior to making such composition into molding pellets or powders and the molding thereof. By the incorporation in accordance with the present invention of such chemical compounds into the polyester, apparently the compounds incorporated in accordance with the present invention have the properties of changing the crystal particle in the molded article so that a fine grain structure is obtained with greatly improved physical properties. That is, compositions in accordance with the present invention, which compositions are made up of polyester having for example from 8–40% of certain compounds added, may not only be molded by conventional procedures but the resultant molded products such as tubes, films, rods and the like possess favorable properties so that they may be formed, milled or otherwise processed without material danger of breakage.

In general our invention may be applied to any high melting linear polyester. Thus, polyesters having a melting point higher than about 150° C. are suitable, and preferably the melting point of the polyester will be around 200° C. or higher. Polyesters derived from the following dicarboxylic acids are particularly suitable: terephthalic, 4,4'-sulfonyldibenzoic, 4,4'-diphenic, 4,4'-dicarboxybenzophenone, 1,2 - di(p-carboxyphenyl)ethane, 1,2-di(p-carboxyphenoxy)ethane, 4,4'-dicarboxydiphenylether, and 2,5-dichloroterephthalic acid.

Copolyesters of the above acids with a minor amount of an aliphatic dicarboxylic acid are particularly useful in the process of the invention. Suitable aliphatic dicarboxylic acids include: succinic, glutaric, adipic, 2-methyladipic, pimelic, suberic, azelaic, and sebacic. Copolyesters containing minor amounts of isophthalic, o-phthalic, tetrahydrophthalic, and hexahydrophthalic are also useful. Dimethylmalonic acid may be used.

The glycols used are represented by: ethylene, trimethylene, tetramethylene, pentamethylene, hexamethylene, octamethylene, and decamethylene. Branched-chain glycols may be used as represented by 2,2-dimethyl-1,3-propanediol, 2-methyl-1,4-butanediol, and 3-methyl-1,5-pentanediol. Glycols containing ether groups may be used, as represented by diethylene glycol, triethylene glycol, and 4,4'-dihydroxydibutylether.

Polyesters derived from terephthalic acid and 1,4-cyclohexane dimethanol, as will be described in more detail hereinafter, when processed in accordance with the present invention, give particularly excellent products. The polyesters referred to may be made by conventional methods applying ester interchange catalysts and the like procedures. The exact source of the polyester and its method of manufacture do not constitute a limitation on the present invention since, as indicated, high melting polyesters in general may be processed in accordance with the present invention.

The compounds which are added to the polyester in accordance with the present invention to improve the polyester, generically are polynuclear aromatic materials that contain at least 30% nuclear chlorine. The nucleus can also contain other substituents as represented by methyl, ethyl, isopropyl, n-butyl, tertiary butyl and the like. Preferably these chlorinated additives will contain 40–60% chlorine. For convenience of reference we may refer to these additives as plasticizers. However, it is to be noted that the chlorinated compounds added in accordance with the present invention differ in function from other compounds conventionally considered as plasticizers. For example, considering the compounds dimethyl phthalate, dibutyl sebacate and the like, which are frequently used in the plastics industry as plasticizers, such compounds not only are not equivalent to the chlorinated compounds when added to polyesters but actually are not suitable for the purposes of the present invention. For example, the phthalate and sebacate compounds just mentioned, if added to polyesters are reacted with the polyester by ester interchange. Furthermore such compounds will not withstand the high molding temperatures which are frequently used for molding polyester materials.

In other words, we have found that many of the various classes of compounds that are frequently employed as plasticizers for cellulose derivatives, vinyl polymers and the like are substantially inoperative in crystalline polyesters of the present invention. Such previously used compounds not only have no softening action at ordinary temperatures on polyesters but may cause degradation under ordinary processing conditions. Therefore our discovery that certain chlorinated aromatic compounds are compatible with polyesters, do not react with the polyester or decompose, are thermally stable and give polyester products that are relatively non-brittle, is thought to be entirely new and unobvious.

In further detail, one class of useful additives is obtained by chlorinating compounds having the following general structure:

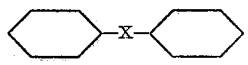

X is a direct bond,

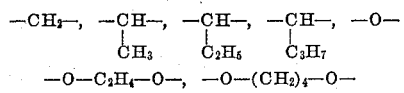

The chlorinated diphenyls containing from 40 to 60% chlorine are especially useful in the process of the invention.

The chlorinated naphthalenes are also of value. It is preferred to use a liquid mixture of isomers containing an average of about 40–60% chlorine.

Chlorinated anthracene and chlorinated phenanthrene are useful, as well as chlorinated retene.

From 8% to 40% and preferably 10% to 25% of the chlorinated aromatic additive is used, based on the weight of the polyester. The additive may be incorporated in the polyester by several different methods. When the polyester is made by the usual melt process, the additive can be incorporated in the melt at the end of the reaction and intimately mixed with the polyester by stirring. Alternatively, a solution of the chlorinated compound in a volatile solvent such as benzene or methylene chloride may be evaporated on the granulated or powdered polyester. In another method, the chlorinated compound and the polyester may be dissolved together in a solvent which is later evaporated. However, this method has somewhat limited usefulness because certain of the polyesters are relatively insoluble.

The treated polyesters, when made by the process of this invention, can be molded by the usual injection and compression methods on standard equipment. The products can also be extruded in the form of rods, tubes, and other shapes. Gears, bearings, cams, etc., can be milled or machined from the extruded rods and bars. The molding temperatures, cooling time, etc., will depend upon the specific type of polyester and plasticizer used. In some cases, the best physical properties are obtained by curing or annealing the molded object at a temperature of 80–150° C. for several minutes or longer.

The relative toughness and flexibility of the molded polyesters were compared by bending a piece 2⅝" x ¼" x ¹⁄₁₆" around a mandrel ½" in diameter. In general, a molded polyester containing no chlorinated compound broke before it was bent 90° around the mandrel. The same polyester containing chlorinated compound could be bent 90° and usually 180° without breaking.

A still further understanding of our invention will be had from consideration of the following examples which are set forth for illustrating our invention.

*Example I*

A high-molecular weight linear polyester was made from 0.80 mole 4,4'-sulfonyldibenzoic acid, 0.20 mole sebacic acid, and pentanediol as described in Caldwell U.S. Patent 2,744,091. At the end of the reaction, while the polyester was melted, fifteen percent by weight of chlorinated diphenyl containing 54% chlorine was added. The polyester melt was stirred until the chlorinated compound was completely dispersed and the melt was then extruded as a ⅛" rod which was cut into ⅛" lengths.

The polyester was molded on a standard injection press. Smooth, tough moldings were obtained that had a softening temperature of 180° C. A molded piece 2⅝" x ¼" x ¹⁄₁₆" was heated at 110° C. for 30 minutes in an annealing oven. The strip could be bent repeatedly 180° around a mandrel ½" in diameter. A similar, untreated molded strip fabricated in the same way broke before it could be bent 90° around the mandrel.

*Example II*

A high-molecular weight linear polyester was made from 0.75 mole 4,4'-sulfonyldibenzoic acid, 0.25 mole azelaic acid and pentanediol as described in Caldwell U.S. Patent 2,744,091. Twenty percent by weight of chlorinated diphenyl containing 54% chlorine was added. The polymer was then converted into ⅛" x ⅛" pellets.

The pellets were molded on a standard injection press to give clear, tough moldings that softened at 160° C. A molded piece 2⅝" x ¼" x ¹⁄₁₆" was heated at 110° C. for 1 hour in an annealing oven. It was very flexible and could be bent repeatedly 180° around a ½" mandrel. A similar molded piece containing no chlorinated additive broke before it could be bent 90° around the mandrel.

*Example III*

Polyethylene terephthalate was granulated to pass a 60-mesh screen. One hundred parts of the granulated polymer was slurried with a solution of 25 parts chlorinated diphenyl containing 54% chlorine in 200 parts of benzene. The benzene was evaporated to leave a deposit of the additive on the polyester granules.

The granules were then molded in a standard injection press to give pieces 2⅝" x ¼" x ¹⁄₁₆". After being heated at 120° C. for 30 minutes, the molded pieces could be bent 180° around a ½" mandrel. Similar pieces, without the chlorinated additive, broke when bent less than 90°.

*Example IV*

In this example 18 parts of chlorinated naphthalene (45% chlorine) was incorporated by the procedure of Example II. The molded pieces were tough and flexible.

*Example V*

A polyester was made from 0.85 mole terephthalic acid, 0.15 mole adipic acid, and ethylene glycol as described in U.S. Patent 2,623,031. Fifteen parts by weight of chlorinated diphenyl ether (50% chlorine) was added to the melt. The product gave tough, strong molded pieces.

*Example VI*

A polyester was made from 2,5-dichloroterephthalic acid and tetramethylene glycol by the standard melt-polymerization technique. At the end of the polymerization, 10% of a chlorinated anthracene containing 44% chlorine was stirred into the melt. The product containing the chlorinated anthracene gave tough, flexible molded pieces. The untreated polymer is very crystalline and molded pieces from it tend to be brittle.

*Example VII*

A polyester was made from 4,4'-diphenic acid and tetramethylene glycol. Twenty parts by weight of a chlorinated diphenyl containing 40% chlorine, was added to the melt. After the chlorinated compound was completely dispersed in the melt, the polymer was extruded as an ⅛" rod which was cut into pellets. Molded pieces were strong, and flexible even after heating to induce crystallization of the polyester.

*Example VIII*

A polyester made from 1,2-di(p-carboxyphenyl)-ethane and ethylene glycol was treated with 10% of the chlorinated compound of Example VII. Molded pieces could be bent 180° around a ½" mandrel.

*Example IX*

A copolyester having the composition 0.5 mole 4,4'-sulfonyldibenzoic acid +0.5 mole succinic acid +1.0 mole tetramethylene glycol was made by a solid-phase process. The polymer was screened to pass 100 mesh. Eighty parts of the polymer was slurried with 20 parts of a chlorinated diphenyl methane containing 50% chlorine, in benzene solution. The benzene was evaporated to leave a coating of chlorinated compound on the copolyester granules. Injection molding of this material gave tough, flexible pieces.

*Example X*

In this example a coplyester was used having the composition 0.75 mole 4,4'-sulfonyldibenzoic acid + 0.25 mole sebacic acid + 1.0 mole pentamethylene glycol with 15% of the chlorinated compound in Example IX. Molded pieces had an impact strength of 18.3 before heating at 110° C. for 2 hours and 14.7 afterwards. The same composition without the chlorinated compound had an impact strength about one hundredth of that after the heat treatment.

*Example XI*

A copolyester was made from 0.7 mole 4,4'-sulfonyldibenzoic acid +0.3 mole azelaic acid +1.0 mole hexamethylene glycol. A chlorinated 1,1-diphenyl ethane was stirred into the melt to give a product containing 10% of the chlorinated compound. Molded pieces were very tough and flexible.

*Example XII*

A high-molecular-weight polyester was made from terephthalic acid and 1,4-cyclohexanedimethanol (70–30 trans-cis mixture. Twenty-five percent by weight of chlorinated diphenyl containing 54% chlorine was added to the melt and the product was converted into ⅛" pellets. Molded pieces were tough and flexible. When the chlorinated compound was omitted, the molded pieces were too brittle to be of use.

*Example XIII*

A polyester was made from 0.80 mole terephthalic acid, 0.20 mole succinic acid, and 1,4-cyclohexanedimethanol. Eighteen percent by weight of chlorinated diphenyl containing 54% chlorine was added. Molded pieces 2⅝" x ¼" x 1/16" were made and heated at 110° C. for 30–40 minutes in an annealing oven. The strips could be bent 180° around a mandrel ½" in diameter. A similar (but not containing the chlorinated compound) strip treated in the same way broke before it could be bent 90° around the mandrel.

*Example XIV*

A polyester was made from terephthalic acid 0.6 mole 1,4-cyclohexanedimethanol, and 0.4 mole bicycloheptanedimethanol. Fifteen parts by weight of the same chlorinated compound as in Example VII was added to the melt. Molded pieces made from the composition were tough and flexible. Without the chlorinated compounds the molded pieces were brittle.

It can be seen from the above description and examples that we have provided a relatively simple and economical method of treating high melting linear crystalline polyesters to obtain compositions that may be very readily molded. The molded products obtained are superior to polyester molded products heretofore produced in that the products of the present invention are much less brittle than prior art products. As a consequence thereof, by the present invention it is possible to make a large variety of products from linear polyesters. That is, after rods or the like articles are molded from compositions of the present invention, the resultant rods or bars may then be machined or milled into gears, cams or other similar articles.

We claim:

1. The process of rendering difficultly moldable high melting linear crystalline polyesters more readily moldable, said polyesters being prepared from an acid component selected from the group consisting of terephthalic, 4,4'-sulfonyldibenzoic, 4,4'-diphenic, 4,4'-dicarboxybenzophenone, 1,2-di(p-carboxyphenyl)ethane, 1,2-di(p-carboxyphenoxy)ethane, 4,4'-dicarboxydiphenylether and 2,5-dichloroterephthalic acid and a glycol component selected from the group consisting of ethylene, trimethylene, tetramethylene, pentamethylene, hexamethylene, octamethylene, decamethylene glycols, 2,2-dimethyl-1,3-propanediol, 2-methyl-1,4-butanediol, 3-methyl-1,5-pentanediol, diethylene glycol, triethylene glycol, 4,4'-dihydroxydibutylether and 1,4-cyclohexane dimethanol, which comprises incorporating into said difficultly moldable polyester 8–40% of a chlorinated diphenyl which chlorinated diphenyl contains from at least 30% nuclear chlorine up to 60% nuclear chlorine said incorporation of the chlorinated diphenyl being accomplished after the preparation of the polyester in the fully polymerized state and prior to the molding thereof.

2. A process in accordance with claim 1 wherein in addition to the acid component set forth there is also present a further acid component selected from the group consisting of succinic, glutaric, adipic, 2-methyladipic, pimelic, suberic, azelaic, sebacic, isophthalic, o-phthalic, tetrahydrophthalic, hexahydrophthalic and dimethylmalonic acids.

3. The process which comprises preparing a solution of a chlorinated diphenyl which contains 30–60% nuclear chlorine in a benzene solvent, adding with mixing the resultant solution to a finely divided high melting linear crystalline polyester prepared from an acid component of the group consisting of terephthalic, 4,4'-sulfonyldibenzoic, 4,4'-diphenic, 4,4'-dicarboxybenzophenone, 1,2-di(p - carboxyphenyl)ethane, 1,2 - di(p - carboxyphenoxy)ethane, 4,4'-dicarboxydiphenylether and 2,5-dichloroterephthalic acid and a glycol component from the group consisting of ethylene, trimethylene, tetramethylene, pentamethylene, hexamethylene, octamethylene, decamethylene glycols, 2,2-dimethyl-1,3-propanediol, 2-methyl-1,4-butanediol, 3-methyl-1,5-pentanediol, diethylene glycol, triethylene glycol, 4,4'-dihydroxydibutylether and 1,4-cyclohexane dimethanol, evaporating a substantial portion of the benzene solvent and thereby obtaining a polyester composition which is adapted to molding.

4. A composition of matter which is comprised of a polyester prepared from an acid component selected from the group consisting of terephthalic, 4,4'-sulfonyldibenzoic, 4,4'-diphenic, 4,4'-dicarboxybenzophenone, 1,2-di(p-carboxyphenyl)ethane, 1,2-di(p-carboxyphenoxy) ethane, 4,4'-dicarboxydiphenylether and 2,5-dichloroterephthalic acid and a glycol component selected from the group consisting of ethylene, trimethylene, tetramethylene, pentamethylene, hexamethylene, octamethylene, decamethylene glycols, 2,2-dimethyl-1,3-propanediol, 2-methyl-1,4-butanediol, 3-methyl-1,5-pentanediol, diethylene glycol, triethylene glycol, 4,4'-dihydroxydibutylether and 1,4-cyclohexane dimethanol, said polyester containing 8–40% of a chlorinated diphenyl having 30–60% of a nuclear chlorine.

5. A composition of matter which comprises a linear polyester prepared from terephthalic acid and cyclohexane dimethanol said polyester having a melting point higher than 150° C. and containing 8–40% of a chlorinated diphenyl which contains from at least 30 to 60% of nuclear chlorine.

6. As a new article of manufacture a relatively nonbrittle, flexible molded article consisting essentially of a high melting linear crystalline polyester said polyester being the reaction product of glycol and dicarboxylic acid components and having a melting point above 150° C. and the polyester containing therein 8–40% of a chlorinated diphenyl, said chlorinated diphenyl containing from at least 30% nuclear chlorine up to 60% nuclear chlorine.

7. A product in accordance with claim 6 wherein the polyester is prepared from glycols and cyclic dicarboxylic acids and the product is in the form of a bar said bar having the property that it can be bent more than 90° around a mandrel ½" in diameter without breaking.

References Cited in the file of this patent

UNITED STATES PATENTS

| | | |
|---|---|---|
| 2,439,953 | Swiss et al. | Apr. 20, 1948 |
| 2,529,260 | Powers | Nov. 7, 1950 |
| 2,623,031 | Snyder | Dec. 23, 1952 |
| 2,732,355 | Ryan | Jan. 24, 1956 |
| 2,744,091 | Caldwell | May 1, 1956 |
| 2,808,390 | Caldwell | Oct. 1, 1957 |

FOREIGN PATENTS

| | | |
|---|---|---|
| 503,749 | Canada | June 22, 1954 |